US012186667B2

(12) United States Patent
Palacios

(10) Patent No.: US 12,186,667 B2
(45) Date of Patent: Jan. 7, 2025

(54) SYSTEMS AND METHODS FOR MODIFYING USER SENTIMENT FOR PLAYING A GAME

(71) Applicant: Sony Interactive Entertainment Inc., Tokyo (JP)

(72) Inventor: Jorge Arroyo Palacios, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 247 days.

(21) Appl. No.: 17/948,588

(22) Filed: Sep. 20, 2022

(65) Prior Publication Data
US 2024/0091650 A1 Mar. 21, 2024

(51) Int. Cl.
*A63F 13/67* (2014.01)
(52) U.S. Cl.
CPC .................. *A63F 13/67* (2014.09)
(58) Field of Classification Search
CPC ........... A63F 13/55; A63F 13/49; A63F 13/67
See application file for complete search history.

(56) References Cited

U.S. PATENT DOCUMENTS

| 10,286,322 | B1 * | 5/2019 | Wakeford | A63F 13/57 |
| 10,394,414 | B1 * | 8/2019 | Wakeford | A63F 13/67 |
| 11,132,598 | B1 * | 9/2021 | Nadji-Tehrani | G06N 3/08 |
| 11,524,237 | B2 * | 12/2022 | Marr | A63F 13/63 |
| 2006/0154710 | A1 * | 7/2006 | Serafat | A63F 13/12 463/29 |
| 2006/0246972 | A1 * | 11/2006 | Thomas | A63F 13/00 463/4 |
| 2006/0287075 | A1 * | 12/2006 | Walker | G07F 17/3269 463/25 |
| 2007/0298886 | A1 * | 12/2007 | Aguilar, Jr. | G07F 17/32 463/42 |
| 2008/0318656 | A1 * | 12/2008 | Walker | G07F 17/3262 463/20 |

(Continued)

FOREIGN PATENT DOCUMENTS

WO 2021185600 A1 9/2021

OTHER PUBLICATIONS

PCT/US2023/073680, Notification of Transmittal of the International Search Report and the Written Opinion of the International Searching Authority, or the Declaration, PCT/ISA/220, and the International Search Report, PCT/ISA/210, Dec. 5, 2023.

*Primary Examiner* — Steve Rowland
(74) *Attorney, Agent, or Firm* — Penilla IP, APC

(57) ABSTRACT

A method for modifying user sentiment is described. The method includes analyzing behavior of a group of players during a play of a game. The behavior of the group of players is indicative of a sentiment of the group of players during the play of the game. The method includes accessing a non-player character (NPC) during the play of the game. The NPC has a characteristic that influences a change in the sentiment of the group of players. The method includes placing the NPC into one or more scenes of the game during the play of the game for a period of time until the change in the sentiment of the group of players is determined. The change in the sentiment of the group of players is determined by analyzing of the behavior of the group of players during said play of the game.

17 Claims, 8 Drawing Sheets

(56) References Cited

U.S. PATENT DOCUMENTS

| | | | |
|---|---|---|---|
| 2009/0182697 A1* | 7/2009 | Massaquoi | G06N 3/04 |
| | | | 703/11 |
| 2012/0015746 A1* | 1/2012 | Mooney | A63F 13/795 |
| | | | 463/42 |
| 2013/0035164 A1* | 2/2013 | Osvald | A63F 13/20 |
| | | | 463/42 |
| 2014/0004948 A1* | 1/2014 | Watkins, Jr. | A63F 13/655 |
| | | | 463/36 |
| 2014/0018143 A1* | 1/2014 | Yarbrough | G07F 17/3262 |
| | | | 463/19 |
| 2014/0267221 A1 | 9/2014 | Paquet et al. | |
| 2014/0342808 A1* | 11/2014 | Chowdhary | A63F 13/493 |
| | | | 463/24 |
| 2018/0001205 A1* | 1/2018 | Osman | A63F 13/5375 |
| 2018/0256981 A1* | 9/2018 | Enomoto | A63F 13/67 |
| 2019/0321727 A1* | 10/2019 | Rodgers | A63F 13/335 |
| 2022/0054943 A1* | 2/2022 | Wu | G06N 3/08 |
| 2022/0193554 A1* | 6/2022 | Kim | A63F 13/67 |

* cited by examiner

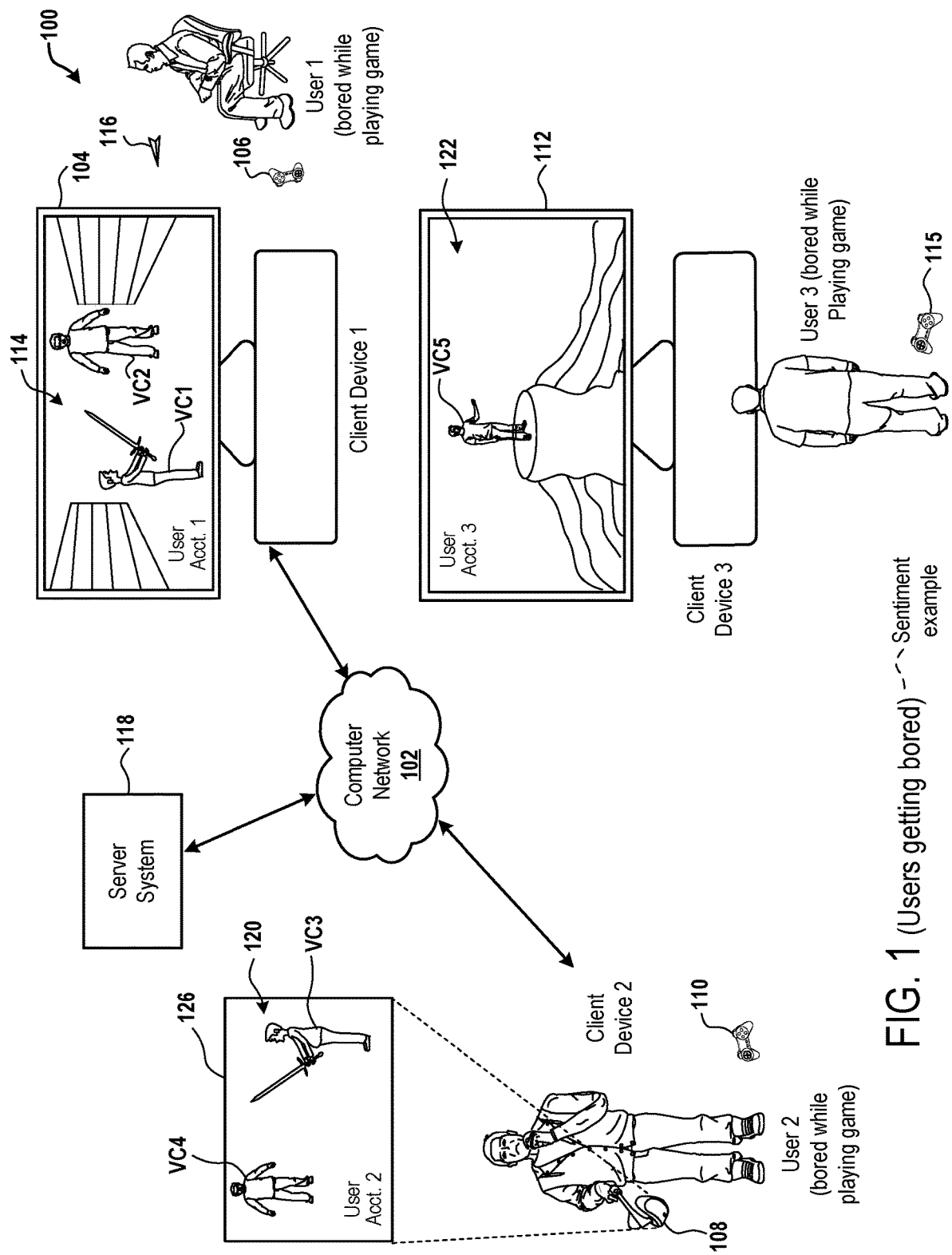
FIG. 1 (Users getting bored) — Sentiment example

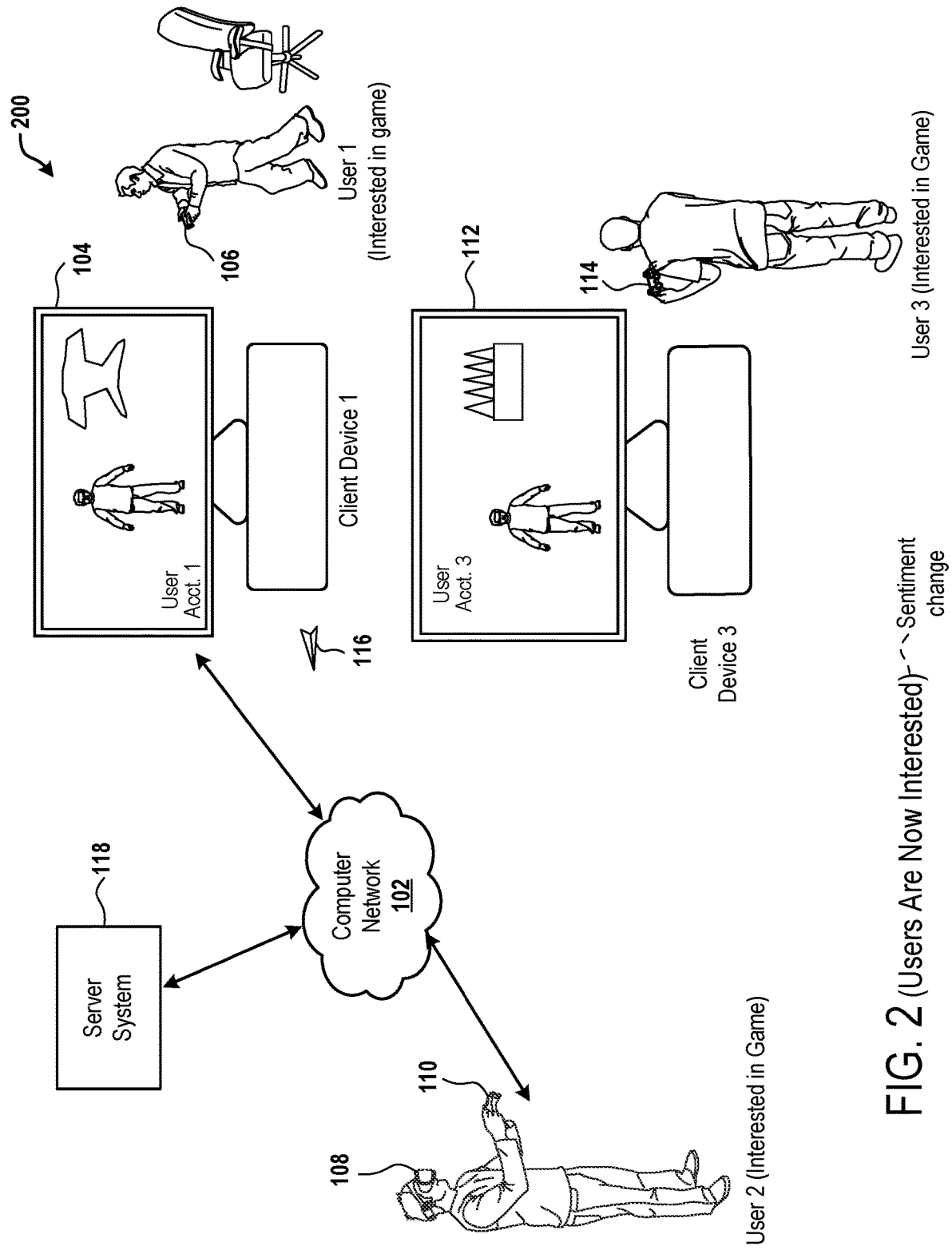
FIG. 2 (Users Are Now Interested)—Sentiment change

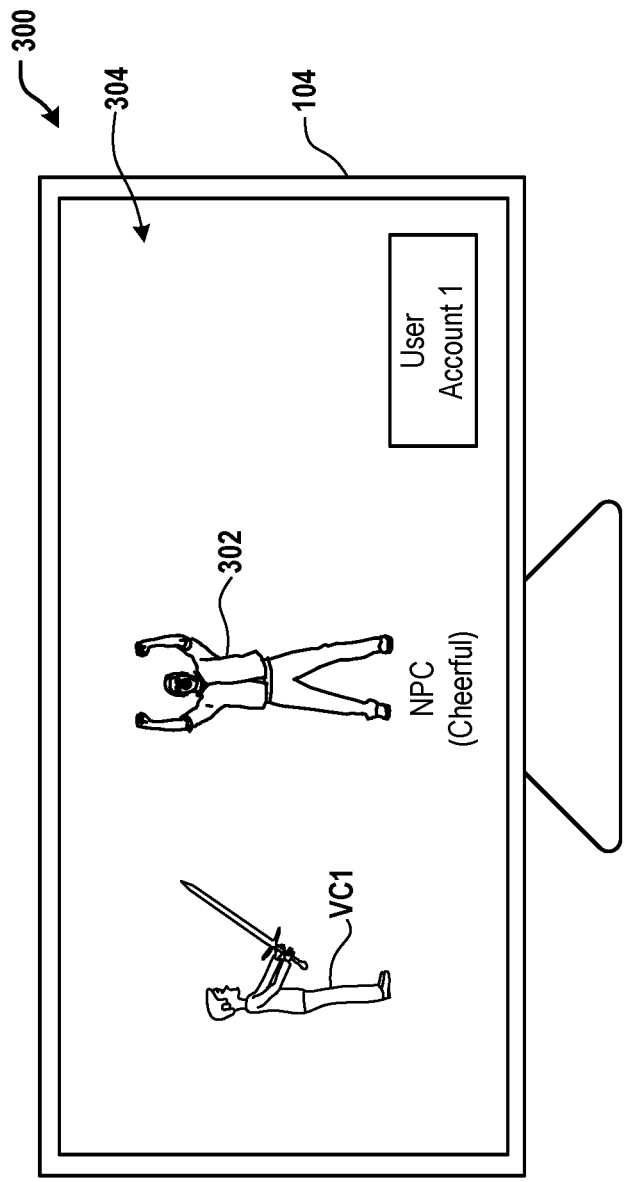
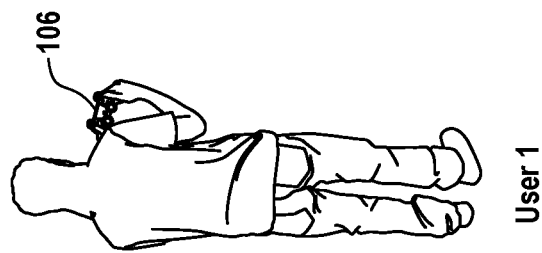
FIG. 3A (NPC to Cheer User 1)

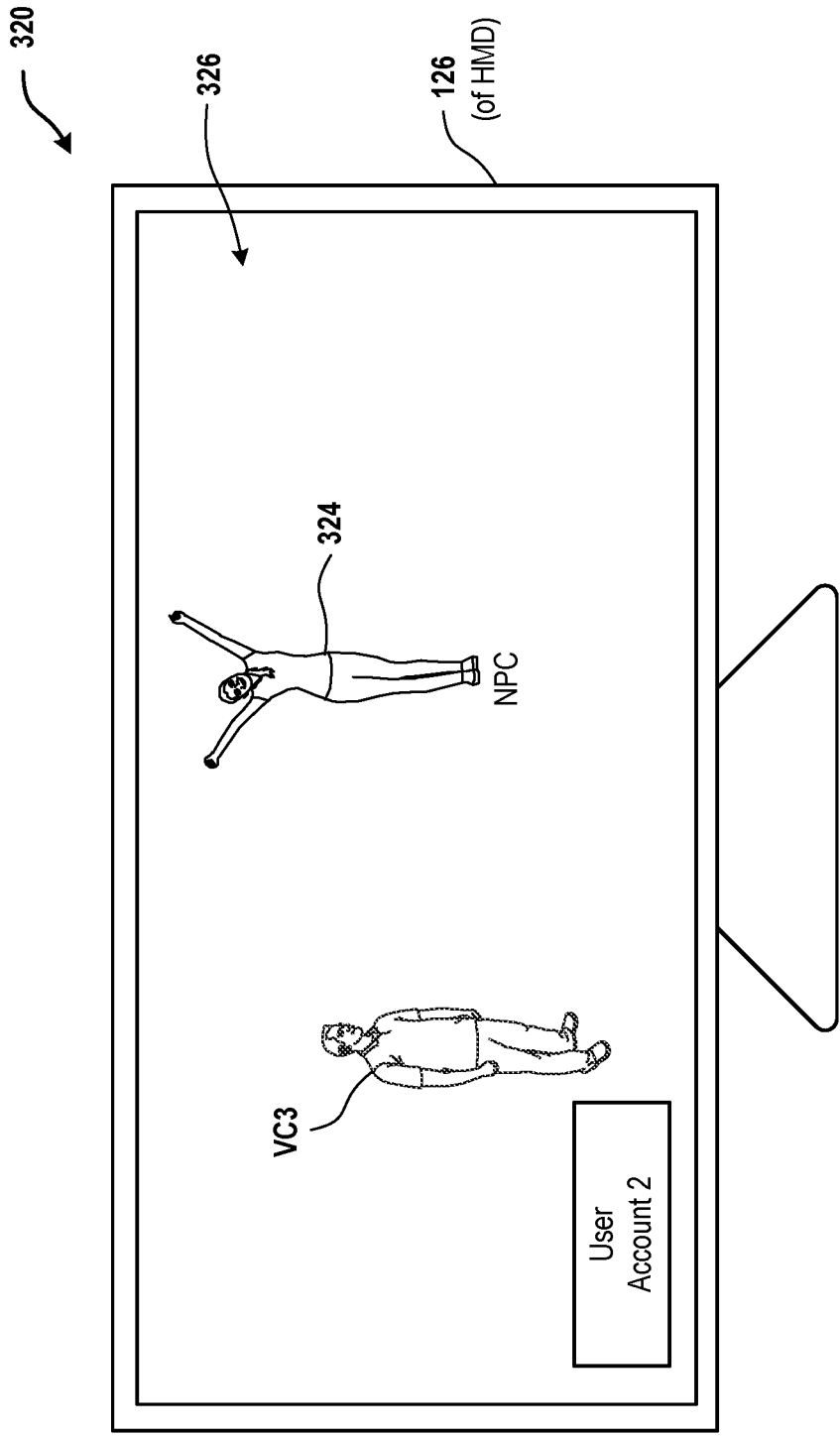
FIG. 3B (NPC to Cheer User 2)

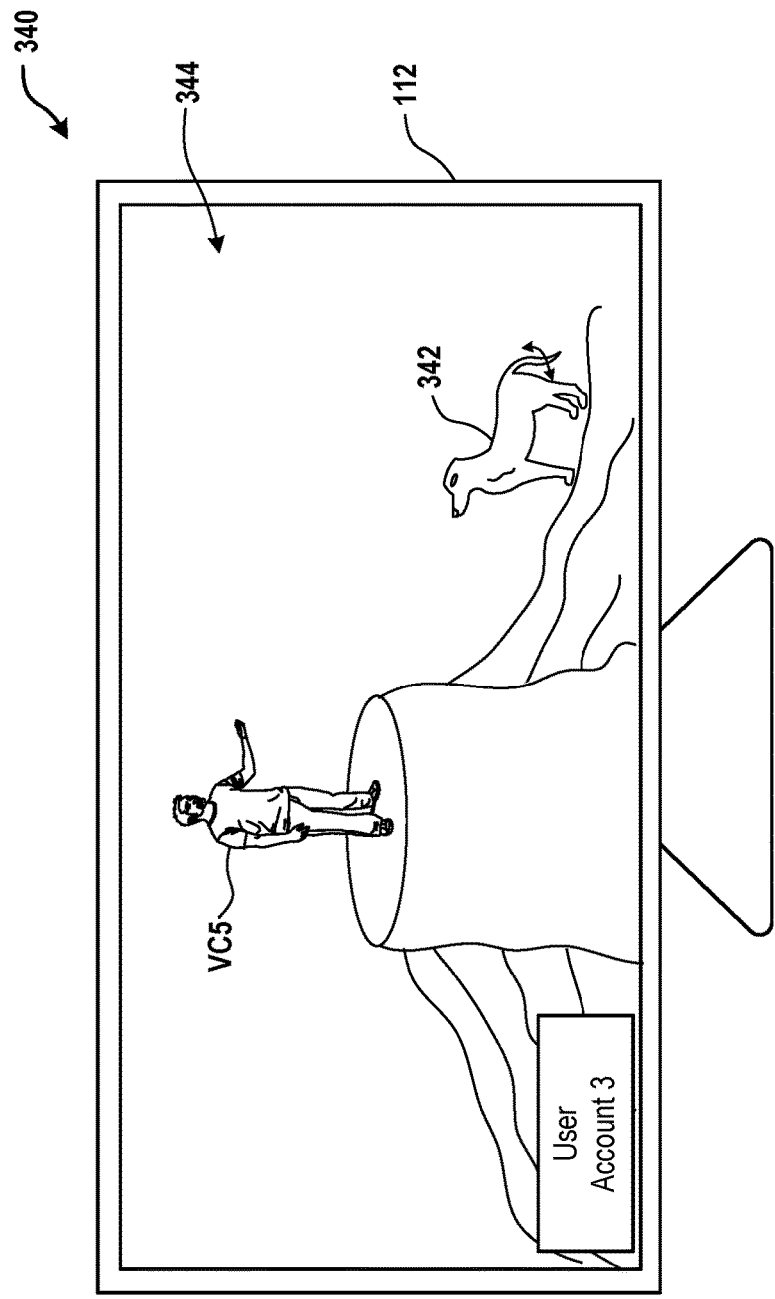
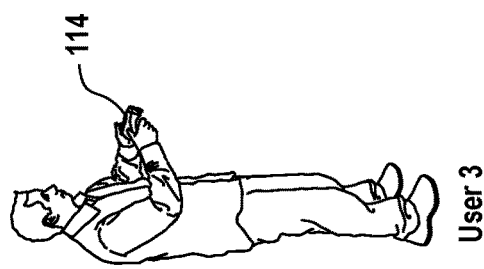
FIG. 3C (NPC to Cheer User 3)

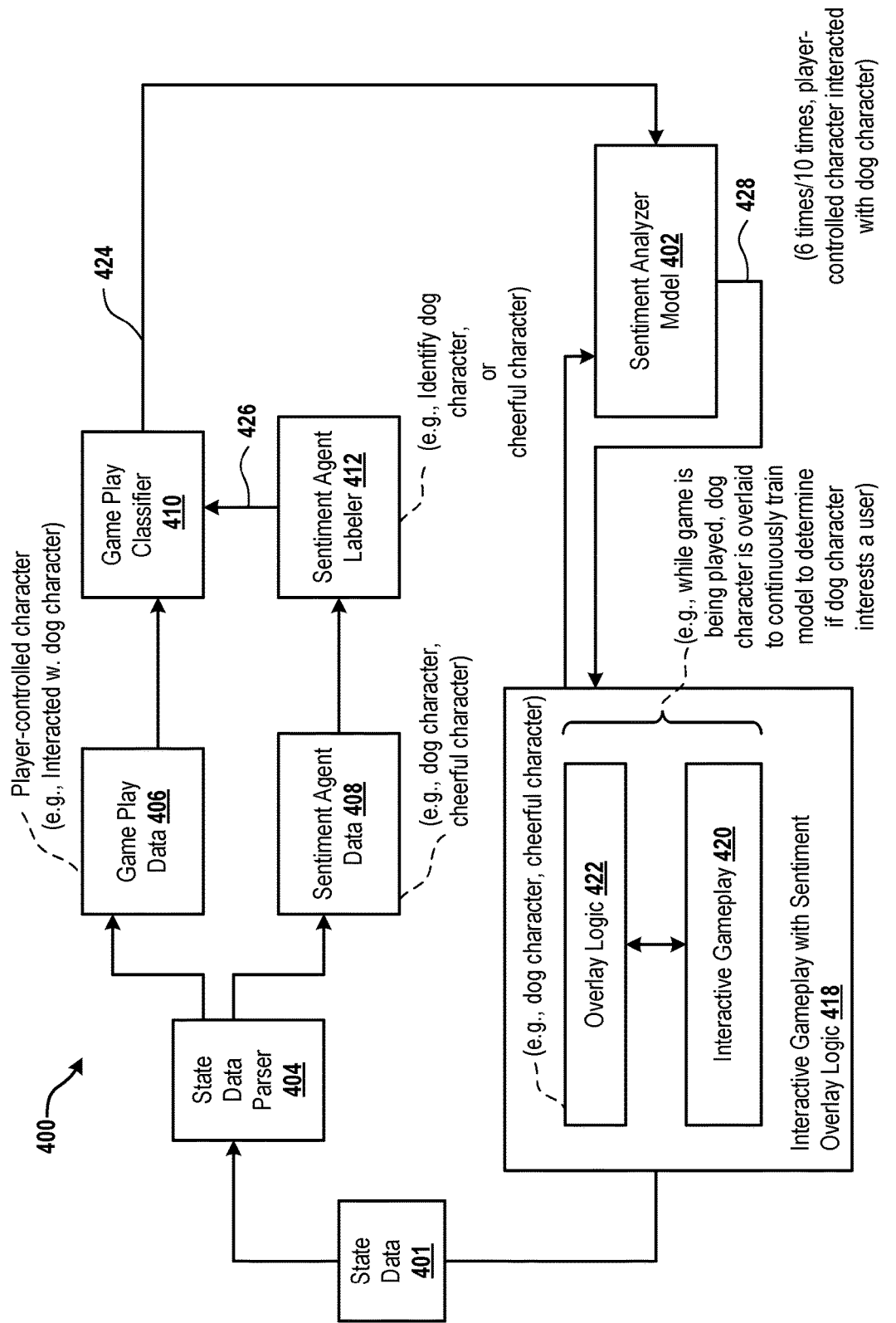

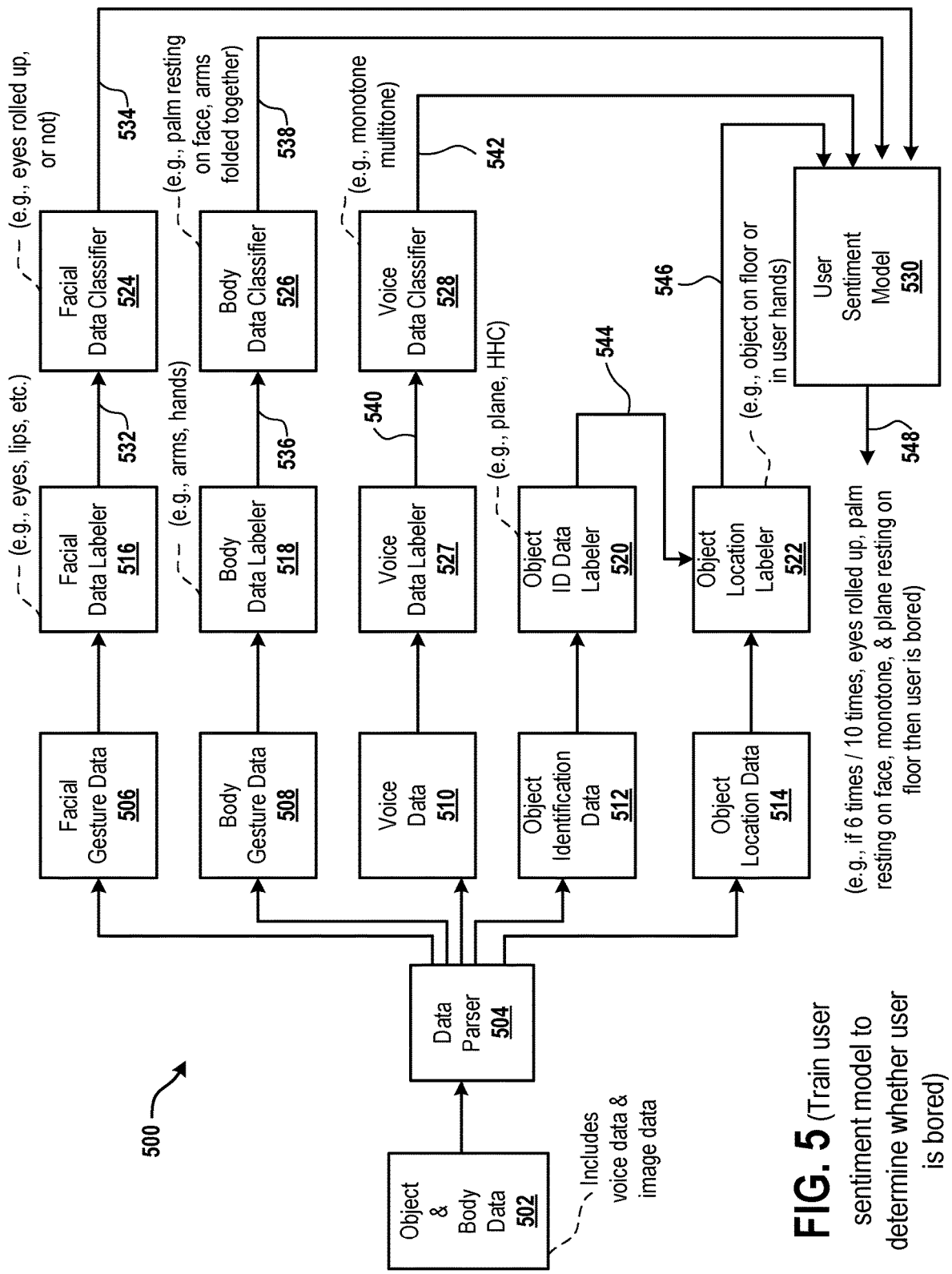
FIG. 5 (Train user sentiment model to determine whether user is bored)

SYSTEMS AND METHODS FOR MODIFYING USER SENTIMENT FOR PLAYING A GAME

FIELD

The present disclosure relates to systems and methods for modifying user sentiment for playing a game.

BACKGROUND

Multi-player gaming is increasing in popularity. For example, games, such as, Apex Legends™ and Fortnite™, are extremely famous not just among teenage players but also among adult players. People spend hours and weekends enjoying these games for years. Also, with time, these games add features to keep the players interested. However, over time, many players seem to lose interest in a video game and switch to another video game.

It is in this context that embodiments of the invention arise.

SUMMARY

Embodiments of the present disclosure provide systems and methods for modifying user sentiment for playing a game.

In an embodiment, in the method for modifying user sentiment, a surrogate artificial intelligence (AI), such as a non-player character (NPC), influences a mood of a group of players. For example, the system detects that a sentiment of the group is bored and is losing interest on a quest in a video game. There is emotional contagion between users in the group. To illustrate, when someone in the group starts yawning, the remaining users in the group start yawning. The surrogate AI has a good mood, and is optimistic and cheering to influence the mood of the group. The NPC extends emotional contagion techniques to influence the mood of the group. For example, the NPC influences the mood of a few users in the group, and remaining users in the group are influenced by emotional contagion from the few users. The mood of the group can be gathered in the video game, such as a multi-player video game, by using biometric signals, facial tracking features, and voice, etc.

In one embodiment, a method for modifying user sentiment is described. The method includes analyzing behavior of a group of players during a play of a game. The behavior of the group of players is indicative of a sentiment of the group of players during the play of the game. The method includes accessing an NPC during the play of the game. The NPC has a characteristic that influences a change in the sentiment of the group of players. The method includes placing the NPC into one or more scenes of the game during the play of the game for a period of time until the change in the sentiment of the group of players is determined. The change in the sentiment of the group of players is determined by analyzing of the behavior of the group of players during the play of the game.

In an embodiment, a server for modifying user sentiment is described. The server includes a memory device and a processor coupled to the memory device. The processor analyzes behavior of a group of players during a play of a game. The behavior of the group of players is indicative of a sentiment of the group of players during the play of the game. The processor accesses an NPC during the play of the game. The NPC has a characteristic that influences a change in the sentiment of the group of players. The processor places the NPC into one or more scenes of the game during the play of the game for a period of time until the change in the sentiment of the group of players is determined. The change in the sentiment of the group of players is determined based on the analysis of the behavior of the group of players during the play of the game.

In one embodiment, a non-transitory computer-readable medium containing program instructions for modifying user sentiment is described. Execution of the program instructions by one or more processors of a computer system causes the one or more processors to carry out operations of analyzing behavior of a group of players during a play of a game. The behavior of the group of players is indicative of a sentiment of the group of players during the play of the game. The operations further include accessing an NPC during the play of the game. The NPC has a characteristic that influences a change in the sentiment of the group of players. The operations include placing the NPC into one or more scenes of the game during the play of the game for a period of time until the change in the sentiment of the group of players is determined. The change in the sentiment of the group of players is determined by the operation of analyzing of the behavior of the group of players during the play of the game.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 1 is a diagram of an embodiment of a system to illustrate a sentiment of multiple users playing a video game.

FIG. 2 is a diagram of an embodiment of a system to illustrate that after being bored, all the users are now interested in playing the video game.

FIG. 3A is a diagram of an embodiment of a system to illustrate a method for modifying a sentiment of one of the users.

FIG. 3B is a diagram of an embodiment of a system to illustrate a method for modifying a sentiment of another one of the users.

FIG. 3C is a diagram of an embodiment of a system to illustrate a method for modifying a sentiment of the yet another one of the users.

FIG. 4 is a diagram of an embodiment of a system for training a sentiment analyzer model to determine a type of sentiment that will affect a mood of a user.

FIG. 5 is a diagram of an embodiment of a system to determine whether one of the users has a sentiment, such as boredom or lack of interest.

DETAILED DESCRIPTION

Figure 6:
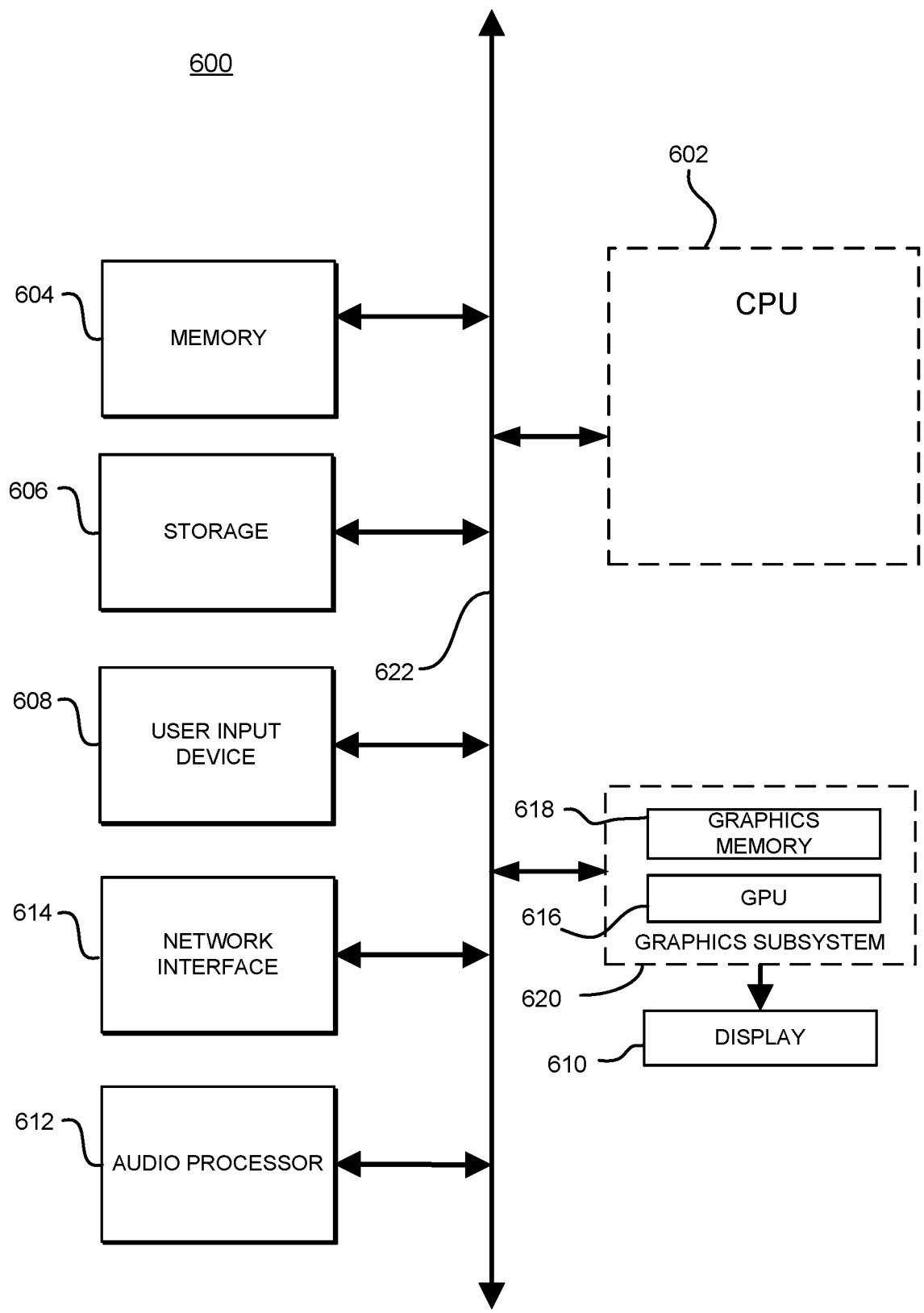
FIG. 6 illustrates components of an example device that can be used to perform aspects of the various embodiments of the present disclosure.

Systems and methods for modifying user sentiment for playing a game are described. It should be noted that various embodiments of the present disclosure are practiced without some or all of these specific details. In other instances, well known process operations have not been described in detail in order not to unnecessarily obscure various embodiments of the present disclosure.

FIG. 1 is a diagram of an embodiment of a system 100 to illustrate a sentiment of multiple users 1, 2, and 3 playing a video game. Each user is sometimes referred to herein as a player. The system 100 includes a client device 1, a client device 2, and a client device 3. The system 100 further includes a computer network 102, such as a wide area network (WAN) or a local area network (LAN) or a combination thereof. For example, the computer network 102 is the Internet or an Intranet or a combination thereof.

The system 100 further includes a server system 118 that is coupled to the client devices 1 through 3 via the computer network 102. An example of the server system 118 includes one or more servers. As an example, each server of the server system 118 includes one or more processors and one or more memory devices. In the example, the one or more processors are coupled to the one or more memory devices.

Examples of a processor include an application specific integrated circuit (ASIC), a central processing unit (CPU), a microprocessor, a microcontroller, and a programmable logic device (PLD). Examples of a memory device include a read-only memory (ROM) and a random access memory (RAM).

The client device 1 includes a display device 104 and a hand-held controller 106, the client device 2 includes a head-mounted display (HMD) 108 and a hand-held controller (HHC) 110, and the client device 3 includes a display device 112 and an HHC 115. Examples of a client device include a laptop computer, a desktop computer, a smart phone, a smart television, a tablet, a combination of a game console, an HHC and a display device, a combination of an HMD, a game console, and an HHC, a combination of the an HHC and a display device, and a combination of an HMD and an HHC. Examples of a display device include an HMD, a computer monitor, a liquid crystal display (LCD) device, a light emitting diode (LED) device, a plasma display device, and a television. Examples of the sentiment include bored, cheerful, frustrated, angry, happy, sad, joyful, mad, glad, excited, interested, satisfied, enthusiastic, and dissatisfied.

To play the video game, the user 1 logs into a user account 1 to access one or more scenes 114 of the video game that are displayed on the display device 104. Media data for displaying the one or more scenes 114 is accessed by the client device 1 from the server system 118 via the computer network 102. However, the user 1 is bored and not interested in playing the video game. During the play of the video game, the user 1 loses interest during a quest of the video game, and therefore places the hand-held controller 106 on a floor of a room in which the user 1 is located and starts flying a paper plane 116.

During the play of the video game, a virtual character VC1 is displayed on the display device 104. The virtual character VC1 is controlled by the user 1 via the HHC 106 to play the video game. Because the user 1 is bored, the user 1 is not controlling the virtual character VC1 via the HHC 106. As such, the virtual character VC1 cannot achieve the quest of fighting against another virtual character VC2 in the video game. As an example, the virtual character VC2 is a monster.

Similarly, to play the video game, the user 2 logs into a user account 2 to access one or more scenes 120 that are displayed on a display screen 126 of the HMD 108. Examples of a display screen include a LCD screen, an LED screen, and a plasma display screen. Media data for displaying the one or more scenes 120 is accessed by the client device 2 from the server system 118 via the computer network 102. However, the user 2 is not interested in playing the video game. During the play of the video game, the user 2 is also bored and loses interest during a quest of the video game, and therefore places the hand-held controller 110 on a floor of a room in which the user 2 is located, removes the HMD 108 from his/her head, and places his/her left hand on his/her chin.

During the play of the video game, a virtual character VC3 is displayed on the display screen 126 of the HMD 108. The virtual character VC3 is controlled by the user 2 via the HHC 108 to play the video game. Because the user 2 is bored, the user 2 is not controlling the virtual character VC3 via the HHC 108. As such, the virtual character VC3 cannot achieve the quest of fighting against another virtual character VC4 in the video game. As an example, the virtual character VC4 is a monster.

Also, to play the video game, the user 3 logs into a user account 3 to access one or more scenes 122 that are displayed on the display device 112. Media data for displaying the one or more scenes 122 is accessed by the client device 3 from the server system 118 via the computer network 102. The user 3 is bored while playing the video game. During the play of the video game, the user 3 loses interest during a quest of the video game, and so places the HHC 115 on a floor of a room in which the user 3 is located and places his/her right and left hands on his/her chin.

During the play of the video game, a virtual character VC5 is displayed on the display device 112. The virtual character VC5 is controlled by the user 3 via the HHC 115 to play the video game. Because the user 3 is bored, the user 3 is not controlling the virtual character VC5 via the HHC 115. As such, the virtual character VC5 cannot achieve the quest of finding virtual treasure in the video game.

In one embodiment, each of the users 1 through 3 is playing a different video game. For example, the user 1 is playing Fortnite™ video game, the user 2 is playing Apex Legends™ video game, and the user 3 is playing FIFA™.

FIG. 2 is a diagram of an embodiment of a system 200 to illustrate that after being bored, all users 1 through 3 are now interested in playing the video game. There is a change in the sentiment of the users 1 through 3. The system 200 includes the client devices 1 through 3, the computer network 102, and the server system 118. The user 1 is playing the video game and is interested in the video game.

The user 1 holds the HHC 106 in his/her hands to achieve the quest during the play of the video game. For example, during a game session, after the user 1 logs into the user account 1, the user 1 gets bored as is illustrated in FIG. 1. In the same game session, the user 1 achieves interest and enthusiasm in playing the video game. In the example, the game session starts after the user 1 logs into the user account 1 and ends when the user 1 logs out of the user account 1. As another example, the user 1 achieves interest and enthusiasm during another game session that follows a game session in which the user 1 is bored. To illustrate, during a first game session that starts after the user 1 logs into the user account 1, the user 1 gets bored as is illustrated in FIG. 1. The user 1 then logs out of the user account 1 to end the first game session. In the illustration, the user 1 logs back into the user account 1 to initiate a second game session and achieves interest in playing the video game during the second game session.

The user 2 is also now interested in playing the video game. For example, the user 2 places the HMD 108 on his/her head and holds the HHC 110 in his/her hands to fulfill a quest during the play the video game. To illustrate, during a game session, after the user 2 logs into the user account 2, the user 2 gets bored as is illustrated in FIG. 1. In the same game session, the user 2 achieves interest and becomes enthusiastic in playing the video game. In the illustration, the game session starts after the user 2 logs into the user account 2 and ends when the user 2 logs out of the user account 2. As another illustration, the user 2 achieves interest and enthusiasm during another game session that follows a game session in which the user 2 is bored. To further illustrate, during a first game session that starts after the user 2 logs into the user account 2, the user 2 gets bored as is illustrated in FIG. 1. The user 2 then logs out of the user account 2 to end the first game session. In the illustration, the user 2 logs back into the user account 2 to start a second game session and becomes interested in playing the video game.

Similarly, the user 3 is now interested in playing the video game. For example, the user 3 holds the HHC 115 in his/her hands and is engrossed in looking at the display device 112 to fulfill a quest during the play the video game. To illustrate, the user 3 achieves interest in achieving a quest while playing the video game during the same game session or a different game session in which the user 3 loses interest during a play of the video game.

FIG. 3A is a diagram of an embodiment of a system 300 to illustrate a method for modifying the sentiment of the user 1. The system 300 includes the display device 104. When the user 1 is bored during the play of the game, data for displaying a non-player character (NPC) 302 is generated by the server system 118 (FIG. 1), and sent via the computer network 102 (FIG. 1) to the client device 1 (FIG. 1). For example, the data for displaying the NPC 302 is generated during the same game session, such as the first game session, in which the user 1 is bored and then expresses interest. As another example, the data for displaying the NPC 302 is generated during a following game session, such as the second game session, in which the user 1 expresses interest. In the example, the user 1 becomes bored during the first game session and logs out of the user account 1 to end the first game session. Further, in the example, the user 1 logs back into user account 1 after logging out of the user account 1 and accesses the video game to start the second game session.

The server system 118 determines to place the NPC 302 in front of the virtual character VC2, e.g., between the virtual characters VC1 and VC2, or determines to overlay the virtual character VC2 with the NPC 302 to cover the virtual character VC2 to generate a virtual scene 304. The virtual scene 304 includes the virtual character VC1 and the NPC 302. As an example, the NPC 302 is not a part of a game code of the video game that generates the virtual characters VC1 and VC2. In the example, the game code is stored on the server system 118.

Upon receiving the data for displaying the NPC 302, a processor of the client device 1 displays the NPC 322 in the video game. The NPC 302 has an expression that cheers up the user 1. For example, the NPC 302 raises its two hands and bends one knee to express enthusiasm in the video game. Upon viewing the NPC 322, the sentiment of the user 1 changes. For example, after viewing the NPC 322, the user 1 becomes interested in playing the video game, grabs the HHC 106, looks at the display device 104, and starts pursuing the quest of defeating the virtual character VC2 (FIG. 1). As another example, the server system 118 controls the NPC 302 to interact with the virtual character VC1. To illustrate, the NPC 302 responds to communication from the virtual character VC1, such as plays with the virtual character VC1 or responds to communication from the virtual character VC1. In the illustration, the user 1 cannot control the NPC 302 via the HHC 106.

FIG. 3B is a diagram of an embodiment of a system 320 to illustrate a method for modifying the sentiment of the user 2. The system 320 includes the display screen 126 of the HMD 108 (FIG. 1), which is now worn by the user 2. When the user 2 is bored during the play of the game, data for displaying an NPC 324 is generated by the server system 118 (FIG. 1), and sent via the computer network 102 (FIG. 1) to the client device 2 (FIG. 1). As an example, the data for displaying the NPC 324 is generated during the same game session, such as the first game session, in which the user 2 is bored and then expresses interest. As another example, the data for displaying the NPC 324 is generated during a following game session, such as the second game session, in which the user 2 expresses interest. In the example, the user 2 becomes bored during the first game session and logs out of the user account 2 to end the first game session. Further, in the example, the user 2 logs back into user account 2 after logging out of the user account 2 and accesses the video game to start the second game session.

The server system 118 determines to place the NPC 324 in front of the virtual character VC4, e.g., between the virtual characters VC3 and VC4, or determines to overlay the virtual character VC3 with the NPC 324 to cover the virtual character VC4 to generate a virtual scene 326. The virtual scene 326 includes the virtual character VC3 and the NPC 324. As an example, the NPC 324 is not a part of the game code of the video game that generates the virtual characters VC3 and VC4.

Upon receiving the data for displaying the NPC 324, a processor of the client device 2 displays the NPC 324 in the video game. The NPC 324 has an expression that cheers up the user 2. For example, the NPC 324 raises its two hands and has its two legs above a virtual ground to express enthusiasm in the video game. Upon viewing the NPC 324, the sentiment of the user 2 changes. For example, after viewing the NPC 324, the user 2 becomes interested in playing the video game, grabs the HHC 110 and the HMD 108, places the HMD 108 on his/her head, looks at the display screen 126, and starts pursuing the quest of defeating the virtual character VC4 (FIG. 1). As another example, the server system 118 controls the NPC 324 to interact with the virtual character VC3. To illustrate, the NPC 324 responds to communication from the virtual character VC3, such as plays with the virtual character VC3 or responds to communication from the virtual character VC3.

In an embodiment, instead of the NPC 324, the same NPC 302 (FIG. 3A) is generated by the server system 118 for display on the display screen 126.

FIG. 3C is a diagram of an embodiment of a system 340 to illustrate a method for modifying the sentiment of the user 3. The system 340 includes the display device 112 of the client device 3 operated by the user 3. When the user 3 is bored during the play of the game, data for displaying an NPC 342 is generated by the server system 118 (FIG. 1), and sent via the computer network 102 (FIG. 1) to the client device 3 (FIG. 1). As an example, the data for displaying the NPC 342 is generated during the same game session, such as the first game session, in which the user 3 is bored and then expresses interest. As another example, the data for displaying the NPC 342 is generated during a following game session, such as the second game session, in which the user 3 expresses interest. In the example, the user 3 becomes bored during the first game session and logs out of the user account 3 to end the first game session. Further, in the example, the user 3 logs back into user account 3 after logging out of the user account 3 and accesses the video game to start the second game session.

The NPC 342 has a characteristic. For example, the NPC 342 jumps up and down and wags its tail. As another example, the NPC 342 barks and wags its tail.

The server system 118 determines to place the NPC 342 in front of the virtual character VC5 to generate a virtual scene 344. The virtual scene 344 includes the virtual character VC5 and the NPC 342. As an example, the NPC 342 is not a part of the game code of the video game that generates the virtual character VC5.

Upon receiving the data for displaying the NPC 342, a processor of the client device 3 displays the NPC 342 in the video game. The NPC 342 has the characteristic, such as an expression, that cheers up the user 3. For example, the NPC 342 barks and wags its virtual tail to express enthusiasm in the video game.

Upon viewing the NPC 342, the sentiment of the user 3 changes. For example, after viewing the NPC 342, the user 3 becomes interested in playing the video game, grabs the HHC 115 in his/her hand, looks at the display device 112, and starts pursuing the quest of achieving the virtual treasure. As another example, the server system 118 controls the NPC 342 to interact with the virtual character VC5. To illustrate, the NPC 342 responds to communication from the virtual character VC5, such as plays with the virtual character VC5 or responds to commands from the virtual character VC5.

In an embodiment, instead of the NPC 342, the same NPC 302 (FIG. 3A) or the NPC 324 (FIG. 3B) is generated by the server system 118 for display on the display device 112.

FIG. 4 is a diagram of an embodiment of a system 400 for training a sentiment analyzer model 402 to determine a type of sentiment that will affect a mood of a user. It should be noted that in an embodiment, the terms type of sentiment, mood, and sentiment are used herein interchangeably.

The system 400 includes state data 401, a state data parser 404, game play data 406, sentiment agent data 408, a gameplay classifier 410, a sentiment agent labeler 412, the sentiment analyzer model 402, and an interactive gameplay with sentiment overlay logic (IGSOL) 418. As an example, each of the state data parser 404, the sentiment agent data 408, the gameplay classifier 410, the sentiment agent labeler 412, the sentiment analyzer model 402, and the IGSOL 418 is a hardware component or a software component or a combination thereof. To illustrate, each of the state data parser 404, the sentiment agent data 408, the gameplay classifier 410, the sentiment agent labeler 412, the sentiment analyzer model 402, and the IGSOL 418 is a software program or a portion of a software program that is executed by the one or more processors of the server system 118 (FIG. 1). To further illustrate, the sentiment analyzer model 402 is a machine learning model or a neural network or an artificial intelligence (AI) model. As another illustration, each of the state data parser 404, the sentiment agent data 408, the gameplay classifier 410, the sentiment agent labeler 412, the sentiment analyzer model 402, and the IGSOL 418 is a hardware circuit portion of an ASIC or a PLD.

Examples of the state data 401 include the gameplay data 406 and the sentiment agent data 408. Examples of the gameplay data 406 include data indicating interactions or lack thereof or a combination thereof between the NPC 302 and the virtual character VC1 (FIG. 3A), interactions or lack thereof or a combination thereof between the NPC 324 and the virtual character VC3 (FIG. 3B), and interactions or lack thereof or a combination thereof between the NPC 342 and the virtual character VC5 (FIG. 3C). To illustrate, the gameplay data 406 includes whether the virtual character VC1 interacts with the NPC 302 or a time period for which the virtual character VC1 interacts with the NPC 302 or a time period for which the virtual character VC1 does not interact with the NPC 302 or a combination thereof. In the illustration, the user 1 controls the virtual character VC1 via the HHC 106 (FIG. 3A) to interact with the NPC 302. As another illustration, the gameplay data 406 includes whether the virtual character VC3 interacts with the NPC 324 or a time period for which the virtual character VC3 interacts with the NPC 324 or a time period for which the virtual character VC3 does not interact with the NPC 324 or a combination thereof. In the illustration, the user 2 controls the virtual character VC3 via the HHC 110 (FIG. 1) to interact with the NPC 324. As yet another illustration, the gameplay data 406 includes whether the virtual character VC5 interacts with the NPC 342 or a time period for which the virtual character VC5 interacts with the NPC 342 or a time period for which the virtual character VC5 does not interact with the NPC 342 or a combination thereof. In the illustration, the user 2 controls the virtual character VC5 via the HHC 115 (FIG. 3C) to interact with the NPC 342.

Examples of an interaction include a communication of audio data and a movement. To illustrate, the NPC 302 has an interaction with the virtual character VC1 when the NPC 302 outputs audio data directed towards, such as addressing, the virtual character VC1. As another illustration, the NPC 302 has an interaction with the virtual character VC1 when the NPC 302 looks towards the virtual character VC1 and jumps in front of VC1. As yet another illustration, the NPC 342 has an interaction with the virtual character VC5 when the NPC 342 looks at the virtual character VC5, and has another interaction with the virtual character VC5 when the NPC 342 barks after looking at the virtual character VC5.

Examples of the sentiment agent data 408 include data identifying the NPC 302, the NPC 324, and the NPC 342, and characteristics of the NPCs 302, 324, and 342. For example, the sentiment agent data 408 includes graphical parameters, such as a shape, color, intensity, texture, and a size, of each of the NPCs 302, 324, and 342. As another example, the sentiment agent data 408 includes data distinguishing the NPC 302 from the NPC 324 and the NPC 342. To illustrate, the sentiment agent data 408 includes data indicating that the NPC 302 is a virtual person, that hands of the NPC 302 are up in virtual air and that one leg of the NPC 302 is bent. In the illustration, the hands being up in the virtual air and the leg being bent are examples of characteristics of the NPC 302. In the illustration, the sentiment agent data 408 includes data indicating that both hands and both legs of the NPC 324 are up in virtual air. Further, in the illustration, the sentiment agent data 408 includes data indicating that the NPC 342 is a virtual dog, has a tail, the tail is wagging, a mouth of the NPC 342 is virtually opening and closing to bark, and the NPC 342 is outputting a barking sound. In the illustration, the wagging tail, the mouth opening and closing, and the barking sound of the NPC 342 are examples of characteristics of the NPC 342.

The IGSOL 418 includes an interactive gameplay logic 420 and an overlay logic 422. An example of the interactive gameplay logic 420 includes the game code of the video game. To illustrate, the game code includes physics for applying to the virtual characters VC1 through VC5 during a play of the video game and the graphical parameters to apply to the virtual characters VC1 through VC5 during the play. An example of the overlay logic 422 includes physics for applying to the NPCs 302, 324, and 342, the graphical parameters to apply to the NPCs 302, 324, and 342, and instructions whether the NPCs 302, 324, and 342 are to augment, such as overlay, any respective virtual characters. To illustrate, the instructions include that the NPC 302 is to cover, such as overlay or obfuscate, the virtual character VC2, the NPC 324 is to cover the virtual character VC4, and the NPC 342 is not to cover any virtual character. Additional examples of the graphical parameters include shade and lighting.

The interactive gameplay logic 420 is coupled to the overlay logic 422 to access, such as make a call to or instruct, the overlay logic 422, during execution of the interactive gameplay logic 420. Moreover, the state data parser 404 is coupled to the gameplay classifier 410 and to the sentiment agent labeler 412. Also, the sentiment agent labeler 412 is coupled to the gameplay classifier 410 and the gameplay classifier 410 is coupled to the sentiment analyzer model 402. The sentiment analyzer model 402 is coupled to the IGSOL 418.

While the interactive gameplay logic 420 is being executed by the server system 118 (FIG. 1), the interactive gameplay logic 420 accesses the overlay logic 422 to place, such as augment or apply, an NPC, such as the NPC 302, 324, or 342, in one or more virtual scenes of the video game. For example, the one or more processors of the server system 118 place the NPC 302 in the virtual scene 304 (FIG. 3A), the NPC 324 in the virtual scene 326 (FIG. 3B), and the NPC 342 in the virtual scene 344 (FIG. 3C). To illustrate, the one or more processors identify from the NPC 302, 324, and 342, that the NPC 302 is to be placed in the virtual scene 304, the NPC 324 is to be placed in the virtual scene 326, and the NPC 342 is to be placed in the virtual scene 344.

When the overlay logic 422 is accessed for execution by the one or more processors of the server system 118 in addition to the execution of the interactive gameplay logic 420, the one or more processors of the server system 118 generate the state data 401. The state data parser 404 parses the state data 401 to identify the gameplay data 406 and the sentiment agent data 408. For example, the state data parser 404 receives the state data 401 and identifies the gameplay data 406 and the sentiment agent data 408 from the state data 401. To illustrate, the state data parser 404 distinguishes the gameplay data 406 from the state data 401. To further illustrate, the state data parser 404 distinguishes between a first set of data indicating an interaction or lack thereof between a virtual character, described herein, and an NPC, described herein, and a second set of data identifying the NPC including the characteristics of the NPC. In the further illustration, the data indicating the interaction or lack thereof includes data indicating a time period of the interaction or lack thereof. In the further illustration, the data indicating the time period includes hours, minutes, and seconds, and the data identifying the NPC includes graphical parameters of the NPC. In the further illustration, the data indicating the interaction or lack thereof includes a position and orientation of the NPC and a position and orientation of the virtual character in a virtual scene, such as the virtual scene 304, 326, or 344 (FIGS. 3A-3C). Moreover, the data indicating the of interaction includes audio data that is output from the NPC in response to audio data output from the virtual character and vice versa. Also, the data indicating the interaction includes movement of the NPC in response to the audio data output from the virtual character or vice versa.

The state data parser 404 provides the gameplay data 406 to the gameplay classifier 410 and the sentiment agent data 408 to the sentiment agent labeler 412. The sentiment agent labeler 412 labels each NPC and the characteristics of the NPC within a virtual scene to output labeled sentiment agent data 426. For example, the sentiment agent labeler 412 assigns a first sentiment agent label to the NPC 302 and a first set of actions of the NPC 302, a second sentiment agent label to the NPC 324 and a second set of actions of the NPC 324, and a third sentiment agent label to the NPC 342 and a third set of actions of the NPC 342. To illustrate, the first set of actions of the NPC 342 is jumping up and down and wagging its tail. In the example, the sentiment agent labeler 412 assigns a fourth sentiment agent label to the NPC 302 and a fourth set of actions of the NPC 302, a fifth sentiment agent label to the NPC 324 and a fifth set of actions of the NPC 324, and a sixth sentiment agent label to the NPC 342 and a sixth set of actions of the NPC 342. To illustrate, the sixth set of actions of the NPC 342 is barking and wagging its tail. Each of the first through sixth sentiment agent labels are different from each other. To illustrate, the first sentiment agent label has different alphanumeric characters than the second sentiment agent label. The first through sixth sentiment agent labels are examples of the labeled sentiment agent data 426. The sentiment agent labeler 412 provides the labeled sentiment agent data 426 to the sentiment agent labeler 412.

The gameplay classifier 410 classifies the gameplay data 406, based on the labeled sentiment agent data 426, to output classified gameplay data 424. For example, the gameplay classifier 410 assigns a first interaction class to a first interaction, occurring for a first time period, between the virtual character VC1 and the NPC 302 executing the first set of actions, a second interaction class to a second interaction, occurring for a second time period, between the virtual character VC3 and the NPC 324 executing the second set of actions, a third interaction class to a third interaction, occurring for a third time period, between the virtual character VC5 and the NPC 342 executing the third set of actions, a fourth interaction class to a fourth interaction, occurring for a fourth time period, between the virtual character VC1 and the NPC 302 executing the fourth set of actions, a fifth interaction class to a fifth interaction, occurring for a fifth time period, between the virtual character VC3 and the NPC 324 executing the fourth set of actions, and a sixth interaction class to a sixth interaction, occurring for a sixth time period, between the virtual character VC5 and the NPC 342 executing the sixth set of actions.

Also, the gameplay classifier 410 the gameplay classifier 410 assigns a seventh interaction class to a lack of the first interaction, an eighth interaction class to a lack of the second interaction, a ninth interaction class to a lack of the third interaction, a tenth interaction class to a lack of the fourth interaction, an eleventh interaction class to a lack of the fifth interaction, and a twelfth interaction class to a lack of the sixth interaction. Examples of a lack of interaction between a virtual character, described herein, and an NPC, described herein, include the virtual character VC1 not replying for a time period to audio data output from the NPC 302, the virtual character VC1 not replying for a time period to a jumping movement of the NPC 302, the virtual character VC3 not replying for a time period to audio data output from or jumping movement of the NPC 324, the virtual character VC5 not replying for a time period to audio data output from or movement of the NPC 342, and the virtual character VC5 not replying for a time period to jumping movement and tail wagging of the NPC 342.

Each of the first through twelfth interaction classes are different from each other. To illustrate, the first interaction class has different alphanumeric characters than the second interaction class. The first through twelfth interaction classes are examples of the classified gameplay data 424.

The sentiment analyzer model 402 is trained based on the classified gameplay data 424 to output sentiment data 428. For example, the sentiment analyzer model 402 is trained to determine that for a number of instances, the virtual character VC1 interacts with the NPC 302 jumping up and down and wagging its tail, and for each of the instances, the virtual character VC1 interacts with the NPC 302 for greater than a predetermined time period. In the example, the number of instances is a majority from multiple instances of interactions and lack of interactions between the virtual character VC1 with the NPC 302 jumping up and down and wagging its tail. In the example, the sentiment analyzer model 402 outputs that there is a high probability, such as a likelihood, that the virtual character VC1 interacts with the NPC 302 jumping up and down and wagging its tail. In the example, the high probability is an example of the sentiment data 428.

As another example, the sentiment analyzer model 402 is trained to determine that for a number of instances, the virtual character VC1 lacks interaction with the NPC 302 wagging its tail and barking, and for each of the instances, the virtual character VC1 lacks interaction with the NPC 302 for greater than a predetermined time period. In the example, the number of instances is a majority from multiple instances of interactions and lack of interactions between the virtual character VC1 and the NPC 302 wagging its tail and barking. In the example, the sentiment analyzer model 402 outputs that there is a high probability that the virtual character VC1 lacks interaction with the NPC 302 wagging its tail and barking. In the example, the high probability is an example of the sentiment data 428.

As yet another example, the sentiment analyzer model 402 is trained to determine that for a number of instances, the virtual character VC3 interacts with the NPC 324 having its hands and legs up in the air, and for each of the instances, the virtual character VC3 interacts with the NPC 324 for greater than a predetermined time period. In the example, the number of instances is a majority from multiple instances of interactions and lack of interactions between the virtual character VC3 and the NPC 324 having its hands and legs up in the air. In the example, the sentiment analyzer model 402 outputs that there is a high probability that the virtual character VC3 interacts with the NPC 324 having its hands and legs up in the air. In the example, the high probability is an example of the sentiment data 428.

As still another example, the sentiment analyzer model 402 is trained to determine that for a number of instances, the virtual character VC3 lacks interaction with the NPC 324 having its legs down on a virtual ground, and for each of the instances, the virtual character VC3 lacks interaction with the NPC 324 for greater than a predetermined time period. In the example, the number of instances is a majority from multiple instances of interactions and lack of interactions between the virtual character VC3 and the NPC 324 having its legs down on the virtual ground. In the example, the sentiment analyzer model 402 outputs that there is a high probability that the virtual character VC3 lacks interaction with the NPC 324 having its legs down on the virtual ground. In the example, the high probability is an example of the sentiment data 428.

As yet another example, the sentiment analyzer model 402 is trained to determine that for a number of instances, the virtual character VC5 interacts with the NPC 342 wagging its tail and barking, and for each of the instances, the virtual character VC5 lacks interacts with the NPC 342 for greater than a predetermined time period. In the example, the number of instances is a majority from multiple instances of interactions and lack of interactions between the virtual character VC5 and the NPC 342 wagging its tail and barking. In the example, the sentiment analyzer model 402 outputs that there is a high probability that the virtual character VC5 interacts with the NPC 342. In the example, the high probability is an example of the sentiment data 428.

As another example, the sentiment analyzer model 402 is trained to determine that for a number of instances, the virtual character VC5 lacks interaction with the NPC 342 wagging its tail and barking, and for each of the instances, the virtual character VC5 lacks interaction with the NPC 342 for greater than a predetermined time period. In the example, the number of instances is a majority from multiple instances of interactions and lack of interactions between the virtual character VC5 and the NPC 342 wagging its tail and barking. In the example, the sentiment analyzer model 402 outputs that there is a high probability that the virtual character VC5 lacks interaction with the NPC 342. In the example, the high probability is an example of the sentiment data 428.

The sentiment data 428 is provided from the sentiment analyzer model 402 to the interactive gameplay logic 420. Based on the sentiment data 428, the gameplay logic 420 determines whether to continue to place an NPC, based on which the sentiment data 428 is output, within one or more virtual scenes of the video game. For example, upon receiving an indication of the high probability that the virtual character VC1 interacts with the NPC 302 from the sentiment analyzer model 402, the interactive gameplay logic 420 continues to access the overlay logic 422 to continue placing the NPC 302 having its hand up in the air in one or more additional virtual scenes of the video game. After placing the NPC 302 in the one or more additional virtual scenes of the video game, the state data 401 is modified to output modified state data, and the sentiment analyzer model 402 continues to be trained based on the modified state data. On the other hand, upon receiving an indication of the high probability that the virtual character VC1 lacks interaction with the NPC 302 having its hand up in the air from the sentiment analyzer model 402, the interactive gameplay logic 420 discontinues the access to the overlay logic 422 to not place the NPC 302 having its hand up in the air in the one or more additional virtual scenes of the video game. Moreover, upon receiving the indication of the high probability that the virtual character VC1 lacks the interaction with the NPC 302 having its hand up in the air, the interactive gameplay logic 420 instructs the overlay logic 422 to place, such as overlay, another NPC, such as the NPC 324 or 342, instead of the NPC 302 in the one or more additional virtual scenes of the video game. The NPC 324 or NPC 342 is placed to execute a set of actions. The one or more additional virtual scenes are generated by the interactive gameplay logic 420 after generating the virtual scene 304 (FIG. 3A).

As another example, upon receiving an indication of the high probability that the virtual character VC3 interacts with the NPC 324 from the sentiment analyzer model 402, the interactive gameplay logic 420 continues to access the overlay logic 422 to continue placing the NPC 324 in one or more additional virtual scenes of the video game. After placing the NPC 324 in the one or more additional virtual scenes of the video game, the state data 401 is modified to output modified state data, and the sentiment analyzer model 402 continues to be trained based on the modified state data. On the other hand, upon receiving an indication of the high probability that the virtual character VC3 lacks interaction with the NPC 324 from the sentiment analyzer model 402, the interactive gameplay logic 420 discontinues the access to the overlay logic 422 to not place the NPC 324 in the one or more additional virtual scenes of the video game. The one or more additional virtual scenes are generated by the interactive gameplay logic 420 after generating the virtual scene 326 (FIG. 3B).

As yet another example, upon receiving an indication of the high probability that the virtual character VC5 interacts with the NPC 342 from the sentiment analyzer model 402, the interactive gameplay logic 420 continues to access the overlay logic 422 to continue placing the NPC 342 in one or more additional virtual scenes of the video game. After placing the NPC 342 in the one or more additional virtual scenes of the video game, the state data 401 is modified to output modified state data, and the sentiment analyzer model 402 continues to be trained based on the modified state data. On the other hand, upon receiving an indication of the high probability that the virtual character VC5 lacks interaction with the NPC 342 from the sentiment analyzer model 402, the interactive gameplay logic 420 discontinues the access to the overlay logic 422 to not place the NPC 342 in the one or more additional virtual scenes of the video game. The one or more additional virtual scenes are generated by the interactive gameplay logic 420 after generating the virtual scene 344 (FIG. 3C).

FIG. 5 is a diagram of an embodiment of a system 500 to determine whether a user, such as the user 1, 2, or 3, has a sentiment, such as boredom or lack of interest. The system 500 includes object and body data 502, a data parser 504, facial gesture data 506, body gesture data 508, voice data 510, object identification (ID) data 512, and object location data 514. The system 500 further includes a facial data labeler 516, a body data labeler 518, an object ID data labeler 520, an object location data labeler 522, a facial data classifier 524, a body data classifier 526, a voice data labeler 527, a voice data classifier 528, and a user sentiment model 530. The user sentiment model 530 is trained to determine whether the user has the sentiment.

As an example, each of the data parser 504, the facial data labeler 516, the body data labeler 518, the object ID data labeler 520, the object location data labeler 522, the facial data classifier 524, the body data classifier 526, the voice data labeler 527, the voice data classifier 528, and the user sentiment model 530 is a hardware component or a software component or a combination thereof. To illustrate, each of the data parser 504, the facial data labeler 516, the body data labeler 518, the object ID data labeler 520, the object location data labeler 522, the facial data classifier 524, the body data classifier 526, the voice data labeler 527, the voice data classifier 528, and the user sentiment model 530 is a software program or a portion of a software program that is executed by the one or more processors of the server system 118 (FIG. 1). To further illustrate, the user sentiment model 530 is a machine learning model or a neural network or an AI model. As another illustration, each of the data parser 504, the facial data labeler 516, the body data labeler 518, the object ID data labeler 520, the object location data labeler 522, the facial data classifier 524, the body data classifier 526, the voice data labeler 527, the voice data classifier 528, and the user sentiment model 530 is a hardware circuit portion of an ASIC or a PLD.

An example of the object and body data 502 includes image data that is captured by cameras of the client devices 1 through 3 (FIG. 1). In the example, the image data includes a location of the HHC 106 in the room in which the user 1 is located, a location of the plane 116 in the room, a direction in which eyes and face of the user 1 are directed with respect to the display device 104, a position of arms of the user 1 with respect to the face of the user 1, a location of the HHC 110 in the room in which the user 2 is located, a location of the HMD 108 with respect to the head of the user 2, a direction in which eyes and face of the user 2 are directed with respect to the HMD 108, a position of arms of the user 2 with respect to the face of the user 2, a location of the HHC 115 in the room in which the user 3 is located, a direction in which eyes of the user 3 are located, a direction in which eyes and face of the user 3 are directed with respect to the display device 112, and a position of arms of the user 3 with respect to the face of the user 3. The client devices 1 through 3 send the image data via the computer network 102 to the server system 118. Examples of the cameras include cameras of the display device 104, the HMD 108, and the display device 112, and cameras of the rooms in which the users 1 through 3 are located. To illustrate, the cameras include an internal camera of the HMD 108 having a field-of-view towards eyes of the user 2 when the user 2 is wearing the HMD 108 on his/her head. In the illustration, the cameras include an external camera of the HMD 108 having a field-of-view directed away from the HMD 108 towards the room in which the user 2 is located.

An example of the object and body data 502 includes audio data that is captured by microphones of the client devices 1 through 3. In the example, the audio data is generated and organized as one or more audio files by the microphones from sounds of the users 1 through 3. The client devices 1 through 3 send the audio files via the computer network 102 to the server system 118.

An example of the facial gesture data 506 includes facial expressions of the users 1 through 3. Illustrations of the facial expressions of the user 1 include that eyes of the user 1 are rolled up or down, and are directed away from or towards the display device 104. Illustrations of the facial expressions of the user 2 include that eyes of the user 2 are rolled up or down, are directed away from or towards the HMD 108, and that eyes of the user 2 are covered or not covered by the HMD 108. Illustrations of the facial expressions of the user 3 includes that eyes of the user 3 are rolled up or down, and are directed away from or towards the display device 112.

An example of the body gesture data 508 includes body expressions of the users 1 through 3. Illustrations of the body expressions of the user 1 include that palms of the user 1 support or do not support a chin of the user 1, that the user 1 is holding or not holding the plane 116, and that the user 1 is holding or not holding the HHC 106. Illustrations of the body expressions of the user 2 include that palms of the user 2 support or do not support a chin of the user 2, that hands of the user 2 are holding or not holding the HMD 108, and that hands of the user 2 are holding or not holding the HHC 110. Illustrations of the body expressions of the user 3 include that palms of the user 3 support or do not support a chin of the user 3, and that hands of the user 3 are holding or not holding the HHC 115.

An example of the voice data 510 includes audio data generated from sounds uttered by the users 1 through 3. Illustrations of the audio data generated from sounds uttered by a user, such as the user 1, 2, or 3, include the user 1 uttering, "I am bored", or "I am excited", or "I am interested". Further illustrations of the void data 510 includes audio data generated by capturing sounds uttered by a user, such as the user 1, 2, or 3, In the further illustrations, the sounds are emitted when the user yawns, laughs, or yells. In these illustrations, yawns are used by the user sentiment model 530 to infer boredom, laughs are used by the user sentiment model 530 to infer happiness or enjoyment, and yelling is used by the user sentiment model 530 to infer frustration.

An example of the object ID data 512 includes whether an object in the room in which a user, such as the user 1, 2, or 3, is located is a plane or an HMD or a display device or an HHC. An example of the object location data 514 includes whether the object is located on a floor on a room or in hands of the user or on a head of the user.

The data parser 502 is coupled to the facial data labeler 516, the body data labeler 518, the voice data labeler 527, the object ID data labeler 520, and the object location labeler 522. The facial data labeler 516 is coupled to the facial data classifier 524, the voice data labeler 527 is coupled to the voice data classifier 528, and the body data labeler 518 is coupled to the body data classifier 526. The object ID data labeler 520 is coupled to the object location labeler 520. The facial data classifier 524, the body data classifier 526, the voice data classifier 528, and the object location labeler 522 are coupled to the user sentiment model 530.

The data parser 504 parses the object and body data 502 to identify the facial gesture data 506, the body gesture data 508, the voice data 510, the object ID data 512, and the object location data 514 from the object and body data 502. For example, the data parser 504 identifies that an audio file, received from a microphone of a client device, is the voice data 510 from the object and body data 502. In the example, the data parser 504 determines that image data received from one of the cameras and having a shape of a face is the facial gesture data 506 and that image data received from one of the cameras and having a shape of a body, such as arms or face or another body part a combination thereof, of the user is the body gesture data 508. Further, in the example, the data parser 504 determines that image data received from one of the cameras and having a shape of a plane or an HHC or an HMD is the object ID data 512 identifying an object in a real-world environment. In the example, the data parser 504 determines that a location of an object on a floor or in hands of a user or on a head of the user is the object location data 514 of the object. The data parser 504 provides the facial gesture data 506 to the facial data labeler 524, the body gesture data 508 to the body data labeler 518, the voice data 510 to the voice data labeler 527, the object ID data 512 to the object ID data labeler 520, and the object location data 514 to the object location labeler 522.

The facial data labeler 516 labels the facial gesture data 506 to output labeled facial gesture data 532. For example, the facial data labeler 516 distinguishes image data indicating a shape of eyes of a user from image data indicating a shape of lips or image data indicating a shape of chin or image data indicating a shape of another facial part of the user. In the example, the facial data labeler 516 assigns a first facial gesture data label indicating that the image data indicates the eyes of the user, a second facial gesture data label indicating that the image data indicates the chin of the user, and a third facial gesture data label indicating that the image data indicates the lips of the user. In the example, the first facial gesture data label, the second facial gesture data label, and the third facial gesture data label are examples of the labeled facial gesture data 532. The facial data labeler 516 provides the labeled facial gesture data 532 to the facial data classifier 524.

The facial data classifier 524 classifies the labeled facial gesture data 532 to output classified facial gesture data 534. For example, the facial data classifier 524 identifies from the labeled facial gesture data 532 that image data of the face of a user, such as the user 1, 2, or 3, indicates that his/her eyes are rolled up or not rolled up. In the example, the facial data classifier 524 assigns a first facial gesture data class indicating that the eyes are rolled up and a second facial gesture data class indicating that the eyes are not rolled up. In the example, the first and second facial gesture data classes are examples of the classified facial gesture data 534. The facial data classifier 524 provides the classified facial gesture data 534 to the user sentiment model 530.

Also, the body data labeler 518 labels the body gesture data 518 to output labeled body gesture data 536. For example, the body data labeler 518 distinguishes image data indicating shapes of one or more palms and chin of a user from image data indicating both arms of the user. In the example, the facial data labeler 516 assigns a first facial gesture data label indicating that the image data indicates the palms and chin of the user and a second facial gesture data label indicating that the image data indicates both arms of the user. In the example, the first facial gesture data label and the second facial gesture data label are examples of the labeled body gesture data 536. The body data labeler 518 provides the labeled body gesture data 536 to the body data classifier 526.

The body data classifier 526 classifies the labeled body gesture data 536 to output classified body gesture data 538. For example, that image data of one or more palms and chin of a user, such as the user 1, 2, or 3, indicates that his/her palms are resting on his/her chin or not resting on the chin. In the example, the body data classifier 526 assigns a first body gesture data class indicating that the palms are resting on his/her chin and a second body gesture data class indicating that the palms are not resting on his/her chin. In the example, the body data classifier 526 assigns a third body gesture data class indicating that the arms are folded across each other and a fourth body gesture data class indicating that the arms are not folded across each other. In the example, the first through fourth body gesture data classes are examples of the classified body gesture data 538. The body data classifier 526 provides the classified body gesture data 538 to the user sentiment model 530.

The voice data labeler 527 labels the voice data 510 to output labeled voice data 540. For example, the voice data labeler 527 identifies a first frequency, a second frequency, a third frequency, a first amplitude, a second amplitude, and a third amplitude from the voice data 510. To illustrate, the voice data labeler 527 applies fast Fourier transform (FFT) to the voice data 510 to identify the first through third frequencies. In the example, the voice data labeler 527 assigns a first voice data label indicating the first frequency, a second voice data label indicating the second frequency, a third voice data label indicating the third frequency, a fourth voice data label indicating the first amplitude, a fifth voice data label indicating the second amplitude, and a sixth voice data label indicating the third amplitude. In the example, the first through sixth voice data labels are examples of the labeled voice data 540. The voice data labeler 527 provides the labeled voice data 540 to the voice data classifier 528.

The voice data classifier 528 classifies the labeled voice data 540 to output classified voice data 542. For example, the voice data classifier 528 distinguishes between audio data that is monotone from audio data that is multitone. In the example, the voice data classifier 528 classifies the first amplitude and the first frequency as monotone and classifies a combination of the second and third amplitudes and the second and third frequencies as multitone. In the example, the voice data classifier 528 assigns a first voice data class to monotone audio data and a second voice data class to multitone audio data. In the example, the first and second voice data classes are examples of the classified voice data 542. The voice data classifier 528 provides the classified voice data 542 to the user sentiment model 530.

The object ID data labeler 520 labels the object ID data 512 to output labeled object ID data 544. For example, the object ID data labeler 520 identifies image data indicating a first object, such as the plane 116, from the object ID data 512 and assigns a first object ID label to the first object. In the example, the object ID data labeler 520 identifies image data indicating a second object, such as an HHC, described herein, from the object ID data 512 and assigns a second object ID label to the second object. Also, in the example, the object ID data labeler 520 identifies image data indicating a third object, such as the HMD 108 (FIG. 1) from the object ID data 512 and assigns a third object ID label to the third object. In the example, the first through third object ID labels are examples of the labeled object ID data 544. The object ID data labeler 520 provides the labeled object ID data 544 to the object location labeler 522.

Moreover, the object location labeler 522 labels the object location data 514 based on the object ID data 544 to output labeled object location data 546. For example, the object location labeler 522 identifies, from the labeled object location data 544, image data indicating that an object, such as an HHC or a plane or the HMD 108, is touching a floor of a room and assigns a first location label to the image data. In the example, the object location labeler 522 identifies, from the labeled object location data 544, image data indicating that the object is not touching the floor and assigns a second location label to the image data. In the example, the object location labeler 522 identifies, from the labeled object location data 544, image data indicating that the object is in hands of a user and assigns a third location label to the image data. Also, in the example, the object location labeler 522 identifies, from the labeled object location data 544, image data indicating the object is not in hands of the user, e.g., is on a head of the user and assigns a fourth location label to the image data. In the example, the first through fourth location labels are examples of the labeled object location data 546. The object location labeler 522 provides the labeled object location data 546 to the user sentiment model 530.

The user sentiment model 530 is trained based on the classified facial gesture data 534, the classified body gesture data 538, the classified voice data 542, and the labeled object location data 546 to output trained data 548. For example, for a majority of instances of receipt of the data 534, 538, 542, and 546, the classified facial gesture data 534 indicates that eyes of a user, such as the user 1, 2, or 3 are rolled up, the classified body gesture data 538 indicates that palms of the user support his/her chin, the classified voice data 542 indicates that audio data generated from voice of the user is monotone, and the labeled object location data 546 indicates that the plane 116 (FIG. 1) is resting on the floor of the room in which the user 1 is located. In the example, the majority of instances is from a pre-determined number of instances. In the example, the user sentiment model 530 outputs that there is a high probability, such as a likelihood, that the user is bored. In the example, the high probability is an example of the trained data 548.

As another example, for a majority of instances of receipt of the data 534, 538, 542, and 546, the classified facial gesture data 534 indicates that eyes of a user, such as the user 1, 2, or 3 are not rolled up, the classified body gesture data 538 indicates that palms of the user do not support his/her chin, the classified voice data 542 indicates that audio data generated from voice of the user is multitone, and the labeled object location data 546 indicates that the plane 116 (FIG. 1) is not found on the floor of the room in which the user 1 is located. In the example, the majority of instances is from a pre-determined number of instances. In the example, the user sentiment model 530 outputs that there is a high probability, such as a likelihood, that the user is not bored and is interested in the video game. In the example, the high probability is an example of the trained data 548.

The user sentiment model 530 is coupled to the interactive gameplay logic 420 (FIG. 4). The user sentiment model 530 provides the trained data 548 to the interactive gameplay logic 420. Upon receiving an indication of the high probability that the user has a sentiment, such as is bored, the interactive gameplay logic 420 accesses the overlay logic 422 to place an NPC in one or more scenes, such as the one or more scenes 114 or 120 or 122 (FIG. 1), of the video game. On the other hand, upon receiving an indication of the high probability that the user has a different sentiment, such as is interested, in the video game, the interactive gameplay logic 420 determines whether the high probability that the user has the different sentiment is received after the NPC is overlaid on the one or more scenes of the video game. Upon determining that the high probability that the user has the different sentiment is received after the NPC is overlaid on the one or more scenes of the video game, the interactive gameplay logic 420 instructs the overlay logic 422 to continue to place the NPC in one or more additional scenes of the video game or discontinue placing, such as not overlay, the NPC in the one or more additional scenes. For example, upon receiving the high probability that the users 1 through 3 are now interested in the video game after being bored, the interactive gameplay logic 420 instructs the overlay logic 422 to periodically place the NPC in the one or more additional scenes or discontinue the overlay of the NPC in the one or more additional scenes. Upon determining that the high probability that the user has the different sentiment is received before the NPC is overlaid on the one or more scenes of the video game, the interactive gameplay logic 420 does not instruct the overlay logic 422 to place the NPC on the one or more scenes of the video game. Data for displaying the one or more additional scenes is generated by the one or more processors of the server system 118 after data for displaying the one or more scenes, such as the one or more scenes 114 or 120 or 122, is generated.

In one embodiment, the overlay logic 402 (FIG. 4) generates an NPC, such as the NPC 302, 324, or 342, whose view, behavior, and/or appearance are personalized to a user, such as the user 1, 2, or 3, to achieve a pre-determined emotion or a pre-determined mood of the user. For example, when the users 1, 2, and 3 are playing the video game, such as World of Warcraft™, as a team, the users are sad because they are virtually attacked in the video game. The user sentiment model 530 outputs the trained data 548 indicating that a morale of the users 1-3 is low, e.g., indicating that the users 1-3 are anxious. Based on the trained data 548, the interactive gameplay logic 420 accesses the overlay logic 422 to generate data for displaying one or more NPCs on the display devices 104, 126, and 112 (FIGS. 3A-3C) operated by the users 1-3. The one or more NPCs displayed on the display devices 104, 126, and 112 reduce anxiety and instill confidence or happiness in the users 1-3. The one or more NPCs are personalized to each of the users 1-3 in the team. This personalization of the one or more NPCs can be based on user information, such as preferences, history, and player profile. The user information is received by the sentiment analyzer model 402 from the user accounts 1-3 and the sentiment analyzer model 402 is trained based on the user information in addition to the classified gameplay data 424 (FIG. 4). To illustrate, when the one or more NPCs that will influence the mood of the team is a virtual pet, for the user 3 who has in his/her profile that he/she likes cats, one of the NPCs is a virtual cat. And in a similar manner, one of the NPCs is a virtual dog for the user 2 who has in his/her player profile that he/she has or likes dogs as pets. The visual and behavioral rendering of the one or more NPCs is personalized for each team member in real time during a play of the video game. In the same manner, as another example, when the team has a low morale and the team has to go to raid another group of players, some of the users 1-3 feel more confident if the one or more NPCs appear to be physically strong, while other players from the users 1-3 feel more confident if remaining of the one or more NPCs appears to be smart or eloquent or full of ideas.

FIG. 6 illustrates components of an example device 600 that can be used to perform aspects of the various embodiments of the present disclosure. This block diagram illustrates the device 600 that can incorporate or can be a personal computer, video game console, personal digital assistant, a server or other digital device, suitable for practicing an embodiment of the disclosure. The device 600 includes a CPU 602 for running software applications and optionally an operating system. The CPU 602 includes one or more homogeneous or heterogeneous processing cores. For example, the CPU 602 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. The device 600 can be a localized to a player playing a game segment (e.g., game console), or remote from the player (e.g., back-end server processor), or one of many servers using virtualization in a game cloud system for remote streaming of gameplay to clients.

A memory 604 stores applications and data for use by the CPU 602. A storage 606 provides non-volatile storage and other computer readable media for applications and data and may include fixed disk drives, removable disk drives, flash memory devices, compact disc-ROM (CD-ROM), digital versatile disc-ROM (DVD-ROM), Blu-ray, high definition-DVD (HD-DVD), or other optical storage devices, as well as signal transmission and storage media. User input devices 608 communicate user inputs from one or more users to the device 600. Examples of the user input devices 608 include keyboards, mouse, joysticks, touch pads, touch screens, still or video recorders/cameras, tracking devices for recognizing gestures, and/or microphones. A network interface 614 allows the device 600 to communicate with other computer systems via an electronic communications network, and may include wired or wireless communication over local area networks and wide area networks, such as the internet. An audio processor 612 is adapted to generate analog or digital audio output from instructions and/or data provided by the CPU 602, the memory 604, and/or data storage 606. The components of device 600, including the CPU 602, the memory 604, the data storage 606, the user input devices 608, the network interface 614, and an audio processor 612 are connected via a data bus 622.

A graphics subsystem 620 is further connected with the data bus 622 and the components of the device 600. The graphics subsystem 620 includes a graphics processing unit (GPU) 616 and a graphics memory 618. The graphics memory 618 includes a display memory (e.g., a frame buffer) used for storing pixel data for each pixel of an output image. The graphics memory 618 can be integrated in the same device as the GPU 616, connected as a separate device with the GPU 616, and/or implemented within the memory 604. Pixel data can be provided to the graphics memory 618 directly from the CPU 602. Alternatively, the CPU 602 provides the GPU 616 with data and/or instructions defining the desired output images, from which the GPU 616 generates the pixel data of one or more output images. The data and/or instructions defining the desired output images can be stored in the memory 604 and/or the graphics memory 618. In an embodiment, the GPU 616 includes three-dimensional (3D) rendering capabilities for generating pixel data for output images from instructions and data defining the geometry, lighting, shading, texturing, motion, and/or camera parameters for a scene. The GPU 616 can further include one or more programmable execution units capable of executing shader programs.

The graphics subsystem 614 periodically outputs pixel data for an image from the graphics memory 618 to be displayed on the display device 610. The display device 610 can be any device capable of displaying visual information in response to a signal from the device 600, including a cathode ray tube (CRT) display, a liquid crystal display (LCD), a plasma display, and an organic light emitting diode (OLED) display. The device 600 can provide the display device 610 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a GPU since it will be doing a large number of relatively simple mathematical operations (e.g., matrix transformations). Other game engine segments that require fewer but more complex operations may be provisioned with a processing entity associated with one or more higher power CPUs.

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and an input/output (I/O) interface. The client device can be a personal computer (PC), a mobile phone, a netbook, a personal digital assistant (PDA), etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device system, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In an embodiment, although the embodiments described herein apply to one or more games, the embodiments apply equally as well to multimedia contexts of one or more interactive spaces, such as a metaverse.

In one embodiment, the various technical examples can be implemented using a virtual environment via the HMD. The HMD can also be referred to as a virtual reality (VR) headset. As used herein, the term "virtual reality" (VR) generally refers to user interaction with a virtual space/environment that involves viewing the virtual space through the HMD (or a VR headset) in a manner that is responsive in real-time to the movements of the HMD (as controlled by the user) to provide the sensation to the user of being in the virtual space or the metaverse. For example, the user may see a three-dimensional (3D) view of the virtual space when facing in a given direction, and when the user turns to a side and thereby turns the HMD likewise, the view to that side in the virtual space is rendered on the HMD. The HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on the HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, compact disc-read only memories (CD-ROMs), CD-recordables (CD-Rs), CD-rewritables (CD-RWs), magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

It should be noted that in various embodiments, one or more features of some embodiments described herein are combined with one or more features of one or more of remaining embodiments described herein.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for modifying user sentiment, comprising:
analyzing behavior of a group of players during a play of a game, the behavior of the group of players is indicative of a sentiment of the group of players during the play of the game;
accessing a non-player character (NPC) during the play of the game, the NPC having a characteristic that is configured to influence a change in the sentiment of the group of players, wherein the characteristic includes a movement of the NPC to influence the sentiment; and
placing the NPC into one or more scenes of the game during the play of the game for a period of time until the change in the sentiment of the group of players is determined, the change in the sentiment of the group of players is determined by said analyzing of the behavior of the group of players during said play of the game.

2. The method of claim 1, further comprising:
receiving image data indicating facial expressions and body expressions of the players from a plurality of digital cameras;
receiving audio data indicating sound expressions of the players from a plurality of microphones;
determining, based on the image data and the audio data, that the sentiment is indicated.

3. The method of claim 2, wherein the image data indicates a plurality of locations of a plurality of objects, wherein said analyzing the behavior includes:
determining, based on the plurality of locations, that the sentiment is indicated.

4. The method of claim 1, further comprising:
removing the NPC upon determining that the change in the sentiment of the group is achieved.

5. The method of claim 1, further comprising continuing to periodically place the NPC into one or more additional scenes of the game after the change in the sentiment is achieved.

6. The method of claim 1, further comprising identifying the NPC from a plurality of NPCs.

7. A server for modifying user sentiment, comprising:
a memory device; and
a processor coupled to the memory device, wherein the processor is configured to:
analyze behavior of a group of players during a play of a game, the behavior of the group of players is indicative of a sentiment of the group of players during the play of the game;
access a non-player character (NPC) during the play of the game, the NPC having a characteristic that is configured to influence a change in the sentiment of the group of players, wherein the characteristic includes a movement of the NPC to influence the sentiment; and
place the NPC into one or more scenes of the game during the play of the game for a period of time until the change in the sentiment of the group of players is determined, the change in the sentiment of the group of players is determined based on the analysis of the behavior of the group of players during the play of the game.

8. The server of claim 7, wherein the processor is configured to:
receive image data indicating facial expressions and body expressions of the players from a plurality of digital cameras;
receive audio data indicating sound expressions of the players from a plurality of microphones;
determine, based on the image data and the audio data, that the sentiment is indicated.

9. The server of claim 8, wherein the image data indicates a plurality of locations of a plurality of objects, wherein to analyze the behavior, the processor is configured to:
determine, based on the plurality of locations, that the sentiment is indicated.

10. The server of claim 7, wherein the processor is configured to:
remove the NPC upon determining that the change in the sentiment of the group is achieved.

11. The server of claim 7, wherein the processor is configured to continue to periodically place the NPC into one or more additional scenes of the game after the change in the sentiment is achieved.

12. The server of claim 7, wherein the processor is configured to identify the NPC from a plurality of NPCs.

13. A non-transitory computer-readable medium containing program instructions for modifying user sentiment, wherein execution of the program instructions by one or more processors of a computer system causes the one or more processors to carry out operations of:
analyzing behavior of a group of players during a play of a game, the behavior of the group of players is indicative of a sentiment of the group of players during the play of the game;
accessing a non-player character (NPC) during the play of the game, the NPC having a characteristic that is configured to influence a change in the sentiment of the group of players, wherein the characteristic includes a movement of the NPC to influence the sentiment; and
placing the NPC into one or more scenes of the game during the play of the game for a period of time until the change in the sentiment of the group of players is determined, the change in the sentiment of the group of players is determined by the operation of analyzing of the behavior of the group of players during said play of the game.

14. The non-transitory computer-readable medium of claim 13, wherein the operations include:
receiving image data indicating facial expressions and body expressions of the players from a plurality of digital cameras;
receiving audio data indicating sound expressions of the players from a plurality of microphones;
determining, based on the image data and the audio data, that the sentiment is indicated.

15. The non-transitory computer-readable medium of claim 14, wherein the image data indicates a plurality of locations of a plurality of objects, wherein the operation of analyzing the behavior includes:
determining, based on the plurality of locations, that the sentiment is indicated.

16. The non-transitory computer-readable medium of claim 13, wherein the operations include:

removing the NPC upon determining that the change in the sentiment of the group is achieved.

17. The non-transitory computer-readable medium of claim 13, wherein the operations include continuing to periodically place the NPC into one or more additional scenes of the game after the change in the sentiment is achieved.

* * * * *